United States Patent Office 3,801,608
Patented Apr. 2, 1974

3,801,608
NOVEL 2,4-DIOLEFINIC 2,2-DIESTERS AND CYANOESTERS
Clive A. Henrick, Palo Alto, Calif., assignor to Zoecon Corporation, Palo Alto, Calif.
No Drawing. Filed July 17, 1972, Ser. No. 272,517
Int. Cl. C08h 3/00
U.S. Cl. 260—399                                   19 Claims

ABSTRACT OF THE DISCLOSURE

Aliphatic substituted di-olefinic geminal diesters and cyanoesters, synthesis thereof and the control of insects.

---

This invention relates to novel aliphatic substituted di-olefinic compounds which are useful as insect control agents. More particularly, the novel di-olefinic compounds of the present invention are represented by the following Formula A:

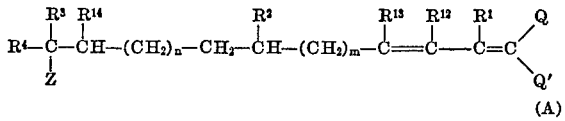

(A)

wherein,

Z is hydrogen, lower alkyl, the group —SR or the group —OR, in which R is hydrogen or lower alkyl;
each of m and n is zero or the positive integer one, two or three;
each of $R^1$ and $R^2$ is lower alkyl;
$R^4$ is alkyl;
each of $R^3$, $R^{12}$, $R^{13}$ and $R^{14}$ is hydrogen or lower alkyl; and
each of Q and Q' is the group —COOR$^7$ or —C≡N, in which $R^7$ is hydrogen or alkyl.

The compounds of Formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of Formula A. Generally, a concentration of less than 25% of the active compound is employed. The formulations can include insect attractants, emulsifying agents or wetting agents to assist in the application and effectiveness of the active ingredient.

The novel diesters and cyanoesters of Formula A of the present invention can be prepared as follows:

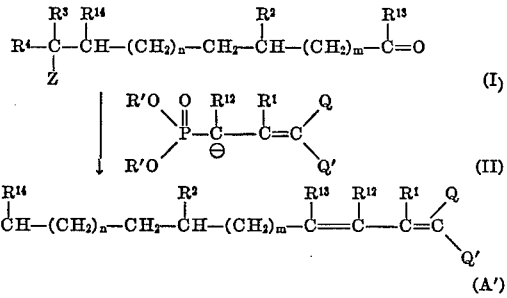

In the above formulas, R' is lower alkyl, benzyl or phenyl and each of Q and Q' is —C≡N or —COOR$^7$ wherein R7≠hydrogen.

In the above outlined synthesis, a carbonyl of Formula I is reacted with a carbanion of Formula II to yield a compound of Formula A'. The carbanion II is generated by treatment of the corresponding phosphonate with a base such as an alkali hydroxide, alkali hydride or alkali alkoxide, e.g. NaOH, NaH, NaOCH$_3$ or NaOC$_2$H$_5$, in an organic solvent inert to the reaction such as benzene, toluene, dimethylformamide, dimethylsulfoxide or tetrahydrofuran. Suitable procedures for the preparation of phosphonate anions and their condensation with a carbonyl are described by Pattenden and Weedon, J. Chem. Soc. (C), 1984 and 1997 (1968); Sasaki, Bull. Chem. Soc. Japan 41, 1252 (1968), and U.S. Pats. 3,163,669 and 3,177,226. The alkyl alkylidene malonates and alkyl alkylidene cyanoesters used as precursors in the preparation of the phosphonates of Formula II can be obtained according to the procedures of Cope and Hancock, J. Am. Chem. Soc. 60, 2644 (1938) and Mosher et al., J. Chem. Soc. (C), 121 (1969).

The starting material carbonyls of Formula I wherein Z is hydrogen or lower alkyl are prepared as described in my application Ser. No. 187,898, filed Oct. 8, 1971, the disclosure of which is incorporated by reference. The starting material carbonyls of Formula I wherein Z is the group —OR are prepared as described in my application Ser. No. 187,897, filed Oct. 8, 1971, the disclosure of which is incorporated by reference. The starting material carbonyls of Formula I wherein Z is the group —SR are prepared as described in my application Ser. No. 256,605, filed May 24, 1972, the disclosure of which is incorporated by reference.

The esters of Formula A' are converted into the corresponding acids by hydrolysis with base such as potassium carbonate, sodium hydroxide, and the like, in an organic solvent such as methanol or ethanol. Other esters of the present invention can be prepared by transesterification or conversion of the acid into the acid halide by treatment with thionyl chloride, oxalyl chloride, phosphorous pentabromide or the like, and then reacting the acid halide with the alcohol corresponding to the ester moiety desired.

The term "alkyl," as used herein, refers to a straight or branched chain saturated aliphatic hydrocarbon group having a chain length of one to twelve carbon atoms, such as methyl, ethyl, n-propyl, i-propyl, n-butyl, n-hexyl, n-amyl, n-heptyl, n-octyl, n-nonyl, lauryl, n-decyl, t-amyl, 3-ethylpentyl and 2-methylhexyl.

EXAMPLE 1

(A) A mixture of 25 ml. of carbon tetrachloride and 25 g. of diethyl isopropylidene malonate (Cope and Hancock, J. Am. Chem. Soc. 60, 2644 (1938) is heated to reflux. To the refluxing solution is added a dry mixture of 22.4 g. of N-bromosuccinimide (NBS) and 0.70 g. of 2,2′-azobis-2-methylpropionitrile (AIBN) over a period of 20 minutes. After two hours of refluxing, 7.5 g. of NBS and 0.25 g. of AIBN are added. Refluxing is continued for an additional ½ hour. The reaction mixture is allowed to cool to room temperature and is then filtered to remove the succinimide formed. Solvent is evaporated at reduced presure to yield ethyl 2-ethoxycarbonyl-3-methyl-4-bromo-2-butenoate.

(B) Triethyl phosphite (20.8 g.) is heated to 120° under nitrogen. Then 42.2 g. of the bromoisopropylidenemalonate obtained in Part A is added dropwise so that the temperature is maintained between 120–130°. When addition is complete, the reaction mixture is stirred at 125° for one hour. The ethyl bromide thus formed is distilled off followed by distillation of the crude phosphonoisopropylidenemalonate through a falling film molecular still using bis-(2-methoxyethyl ether) (B.P. 161–63°) as the heat source and a reduced pressure of 0.2 mm. to yield triethyl 2-ethoxycarbonyl-3-methyl-4-phosphono-2-butenoate.

(C) To a mixture of 8.8 g. of the phosphonoisopropylidenemalonate of Part B, 3.1 g. of 3,7-dimethyloctan-1-al and 10 ml. of dry dimethylformamide, stirring under nitrogen, is added 0.88 g. of sodium hydroxide and the reaction is allowed to stir at room temperature for three hours. Hexane (15 ml.) and water (40 ml.) is added and the layers separated. The organic phase is washed with water and brine, dried over calcium sulfate and evaporated under vacuum. The crude product is filtered through Florosil to give ethyl 2-ethoxycarbonyl-3,7,11-trimethyldodeca-2,4-dienoate, which can be further purified by chromatography on silica gel preparative plates eluting with 15% ether in hexane.

EXAMPLE 2

Each of the carbonyl compounds under Column I is used in place of 3.7-dimethyloctan-1-al in the process of Example 1, part C to prepare the corresponding di-olefinic gem-diester under Column II.

I 3-methyl-7-ethylnonan-1-al,
3,6,7-trimethyloctan-1-al,
2,4,5-trimethylhexan-1-al,
3,7-dimethylnonan-1-al,
3,6-dimethylheptan-1-al,
2,5-dimethylhexan-1-al,
4,9-dimethyldecan-1-al,
3,7,7-trimethyloctan-1-al,
3,6,6-trimethylheptan-1-al,
4,8-dimethyldecan-2-one,
4,7-dimethyloctan-2-one,
3,6,7-trimethylnonan-2-one.

II ethyl 2-ethoxycarbonyl-3,7-dimethyl-11-ethyltrideca-2,4-dienoate,
ethyl 2-ethoxycarbonyl-3,7,10,11-tetramethyldodeca-2,4-dienoate,
ethyl 2-ethoxycarbonyl-3,6,8,9-tetramethyldeca-2,4-dienoate,
ethyl 2-ethoxycarbonyl-3,7,11-trimethyltrideca-2,4-dienoate,
ethyl 2-ethoxycarbonyl-3,7,10-trimethylundeca-2,4-dienoate,
ethyl 2-ethoxycarbonyl-3,6,9-trimethyldeca-2,4-dienoate,
ethyl 2-ethoxycarbonyl-3,8,13-trimethyltetradeca-2,4-dienoate,
ethyl 2-ethoxycarbonyl-3,7,11,11-tetramethyldodeca-2,4-dienoate,
ethyl 2-ethoxycarbonyl-3,7,10,10-tetramethylundeca-2,4-dienoate,
ethyl 2-ethoxycarbonyl-3,5,7,11-tetramethyltrideca-2,4-dienoate,
ethyl 2-ethoxycarbonyl-3,5,7,10-tetramethylundeca-2,4-dienoate, and
ethyl 2-ethoxycarbonyl-3,5,6,9,10-pentamethyldodeca-2,4-dienoate,

EXAMPLE 3

Triethyl 2-ethoxycarbonyl-3-methyl-4-phosphono-2-butenoate is prepared following the procedure of Example 1, Parts A and B.

To a mixture of 0.75 g. of 7-methoxy-3,7-dimethyl-octan-1-al, 1.5 g. of the above phosphonate and 50 ml. of dimethylformamide, under nitrogen, is slowly added sodium ethoxide (prepared from 200 mg. of sodium and 12 ml. of ethanol). The mixture is allowed to stand at room temperature for two hours and then is worked up with ether. The ethereal extracts are dried, concentrated and then chromatographed on silica plates eluting with hexane/ether to yield ethyl 2-ethoxycarbonyl-11-methoxy-3,7,11-trimethyldodeca-2,4-dienoate.

By repeating the above process, using each of the aldehydes under Column III as the starting material, there is prepared the respective gem-diester under Column IV.

III 7-methoxy-3,7-dimethylnonan-1-al,
7-methoxy-3-methyl-7-ethylnonan-1-al,
7-ethoxy-3,7-diethylnonan-1-al,
8-ethoxy-4,8-dimethylnonan-1-al,
6-ethoxy-3,6-dimethylheptan-1-al,
6-isopropoxy-3,6-dimethyloctan-1-al,
6-isopropoxy-2,6-dimethylheptan-1-al,
5-hydroxy-2,5-dimethylhexan-1-al,
9-hydroxy-4-ethyl-9-methyldecan-1-al.

IV ethyl 2-ethoxycarbonyl-11-methoxy-3,7,11-trimethyl-trideca-2,4-dienoate,
ethyl 2-ethoxycarbonyl-11-methoxy-3,7-dimethyl-11-ethyltrideca-2,4-dienoate,
ethyl 2-ethoxycarbonyl-11-ethoxy-3-methyl-7,11-diethyl-trideca-2,4-dienoate,
ethyl 2-ethoxycarbonyl-12-ethoxy-3,8,12-trimethyl-trideca-2,4-dienoate,
ethyl 2-ethoxycarbonyl-10-ethoxy-3,7,10-trimethylundeca-2,4-dienoate,
ethyl 2-ethoxycarbonyl-10-isopropoxy-3,7,10-trimethyl-dodeca-2,4-dienoate,
ethyl 2-ethoxycarbonyl-10-isopropoxy-3,6,10-trimethyl-undeca-2,4-dienoate,
ethyl 2-ethoxycarbonyl-9-hydroxy-3,6,9-trimethyldeca-2,4-dienoate,
ethyl 2-ethoxycarbonyl-13-hydroxy-3,13-dimethyl-8-ethyltetradeca-2,4-dienoate.

EXAMPLE 4

Sodium methoxide (1.2 g. of sodium and 30 ml. of methanol) is added slowly to a mixture of 4.1 g. of 7-methylthio-3,7-dimethyl-octan-1-al and 10 g. of the phosphonoisopropylidenemalonate of Example 1 (Parts A and B) in 50 ml. of dimethylformamide, under nitrogen and at about 0°, with stirring. After addition is complete, the reaction is left three hours at room temperature and worked up by extraction with hexane/ether to yield ethyl 2-ethoxycarbonyl-11-methylthio-3,7,11 - trimethyldodeca-2,4-dienoate.

Using the foregoing procedure, each of the aldehydes under Column V is converted into the corresponding gem-diester under Column VI.

V 7-methylthio-3,7-dimethylnonan-1-al,
7-methylthio-3-ethyl-7-methylnonan-1-al,
6-methylthio-3,5,6-trimethylheptan-1-al,
5-methylthio-2,5-dimethylhexan-1-al,
7-mercapto-3,7-dimethyloctan-1-al,
6-mercapto-3,6-dimethylheptan-1-al.

VI ethyl 2-ethoxycarbonyl-11-methylthio 3,7,11-trimethyltrideca-2,4-dienoate,
ethyl 2-ethoxycarbonyl-11-methylthio-3,11-dimethyl-7-ethyltrideca-2,4-dienoate,
ethyl 2-ethoxycarbonyl-10-methylthio-3,7,9,10-tetramethylundeca-2,4-dienoate,
ethyl 2-ethoxycarbonyl-9-methylthio-3,6,9-trimethyldeca-2,4-dienoate,
ethyl 2-ethoxycarbonyl-11-mercapto-3,7,11-trimethyldodeca-2,4-dienoate,
ethyl 2-ethoxycarbonyl-10-mercapto-3,7,10-trimethylundeca-2,4-dienoate.

EXAMPLE 5

To 250 ml. of ethanol, 105 ml. of water and 70 ml. of 50% aqueous sodium hydroxide is added 25 g. of ethyl 2-ethoxycarbonyl - 3,7,11 - trimethyldodeca-2,4-dienoate. The mixture is refluxed for about 16 hours. After cooling, alcohol is removed in vacuo. Water is added followed by acidification and then extraction with ether to yield 2-hydroxycarbonyl-3,7,11-trimethyldodeca-2,4-dienoic acid.

By use of the above process, the other diesters under Columns II, IV and VI are hydrolyzed to the respective free diacids.

EXAMPLE 6

To 0.25 g. of the diacid of Example 5 in 10 ml. of benzene, under nitrogen, is added 0.17 ml. of oxalyl chloride and the mixture stirred for about 45 minutes and then allowed to stand 2 hours. Two ml. of methanol is added. After 3 hours, ether is added and the organic layer separated, washed with aqueous sodium bicarbonate and brine, dried over calcium sulfate and concentrated at reduced pressure to yield methyl 2-methoxycarbonyl-3,7,11-trimethyldodeca-2,4-dienoate, which can be purified by chromatography or distillation.

Using other alcohols such as isopropanol, butanol, etc. in place of methanol in the above process, other diesters of the present invention are obtained.

EXAMPLE 7

(A) Ethyl 2-cyano-3-methylbut-2-enoate is prepared following the procedure of Mosher et al., J. Chem. Soc. C. 121 (1969) and converted into its bromo-derivative and then into the phosphonoderivative using the process of Example 1, Parts A and B.

(B) Triethyl 2-cyano - 3 - methyl-4-phosphono-2-butenoate prepared in Part A of this example (682 mg.) is slowly added to 126 mg. of 57% dispersion of sodium hydride in oil, which has been previously washed several times with pentane, stirring in 5 ml. of dry tetrahydrofuran at −10° under argon. The solution is then transferred to a solution of 425 mg. of 3,7-dimethyloctan-1-al in 5 ml. of dry tetrahydrofuran under argon over a period of about 10 minutes at room temperature. After about two hours, water and ether is added and the layers separated. The organic layer is washed with brine, dried over calcium sulfate and evaporated with vacuum to yield ethyl 2-cyano-3,7,11-trimethyldodeca-2,4-dienoate, which can be purified by chromatography or distillation.

EXAMPLE 8

Each of 7-methoxy-3,7-dimethyloctan-1-al, 7 - methylthio-3,7-dimethyloctan-1-al, 7-hydroxy - 3,7 - dimethyloctan-1-al, 7-mercapto-3,7-dimethyloctan-1-al and the other carbonyls under Columns I, III and V is reacted with the cyanophosphonate of Example 7 as described therein, to prepare:

ethyl 2-cyan-11-methoxy-3,7,11-trimethyldodeca-2,4-dienoate,
ethyl 2-cyano-11-methylthio-3,7,11-trimethyldodeca-2,4-dienoate,
ethyl 2-cyano-11-hydroxy-3,7,11-trimethyldodeca-2,4-dienoate,
ethyl 2-cyano-11-mercapto-3,7,11-trimethyldodeca-2,4-dienoate, etc.

What is claimed is:
1. A compound of the formula

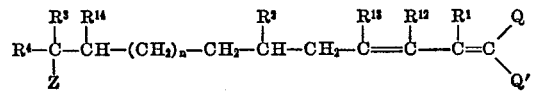

wherein,
Z is hydrogen, lower alkyl, the group —SR or the group —OR, in which R is hydrogen, methyl or ethyl;
$n$ is zero or the positive integer one;
each of $R^1$, $R^2$, and $R^4$ is lower alkyl;
each of $R^3$, $R^{12}$, $R^{13}$, and $R^{14}$ is hydrogen or lower alkyl;
Q is the group —COOR$^7$;
Q' is the group —COOR$^1$ or —C≡N; and
$R^7$ is hydrogen or lower alkyl.

2. A compound according to claim 1 wherein $R^1$ is methyl; $R^2$ is methyl or ethyl; each of $R^{12}$, $R^{13}$, and $R^{14}$ is hydrogen or methyl; and $R^3$ is hydrogen, methyl or ethyl.

3. A compound according to claim 2 wherein each of $R^{12}$, $R^{13}$ and $R^{14}$ is hydrogen; $R^3$ is methyl or ethyl; and Q' is the group —COOR$^7$.

4. A compound according to claim 3 wherein Z is hydrogen or methyl; $R^7$ is hydrogen, methyl, or ethyl; $n$ is is one; each of $R^2$ and $R^3$ is methyl; and $R^4$ is methyl or ethyl.

5. The compound, 2-hydroxycarbonyl - 3,7,11 - trimethyldodeca-2,4-dienoic acid, according to claim 4.

6. The compound, 2 - hydroxycarbonyl - 3,7,11 - trimethyltrideca-2,4-dienoic acid.

7. The compound, ethyl 2-ethoxycarbonyl-3,7,11-trimethyltrideca - 2,4 - dienoate, according to claim 4.

8. A compound according to claim 4 wherein Z is hydrogen; $R^7$ is methyl or ethyl; and $R^4$ is methyl.

9. The compound, ethyl 2 - ethoxycarbonyl - 3,7,11-trimethyldodeca-2,4-dienoate, according to claim 8.

10. A compound according to claim 2 wherein Z is the group —SR or the group —OR; $R^7$ is hydrogen, methyl or ethyl; each of $R^2$, $R^3$ and $R^4$ is methyl; and $n$ is one.

11. A compound according to claim 10 wherein Z is mercapto or methylthio and $R^7$ is methyl or ethyl.

12. A compound according to claim 10 wherein Z is hydroxy or methoxy and $R^7$ is methyl or ethyl.

13. The compound, 2 - hydroxycarbonyl 11 - methoxy-3,7,11 - trimethyldodeca - 2,4 - dienoic acid, according to claim 10.

14. The compound, 2 - hydroxycarbonyl 11 - methoxy-3,7,11 - trimethyltrideca - 2,4 - dienoic acid, according to claim 10.

15. The compound, ethyl 2-ethoxycarbonyl 11-methoxy - 3,7,11 - trimethyldodeca - 2,4 - dienoate, according to claim 12.

16. The compound, ethyl 2 - ethoxycarbonyl 11 - methoxy - 3,7,11 - trimethyltrideca-2,4-dienoate, according to claim 12.

17. A compound according to claim 2 wherein $R^7$ is hydrogen, methyl or ethyl and $Q'$ is cyano.

18. A compound according to claim 17 wherein $n$ is one; each of $R^2$, $R^3$ and $R^4$ is methyl; and Z is hydrogen, methyl, —SR or —OR in which R is hydrogen or methyl.

19. A compound according to claim 18 wherein $R^7$ is methyl or ethyl and Z is hydrogen, methylthio or methoxy.

References Cited
UNITED STATES PATENTS

| | | | |
|---|---|---|---|
| 3,692,851 | 9/1972 | Henrick et al. | 260—654 R |
| 3,697,543 | 10/1972 | Pfeffner et al. | 260—327 E |

ELBERT L. ROBERTS, Primary Examiner

U.S. Cl. X.R.

260—400, 404, 413, 410.9